Figure 1:
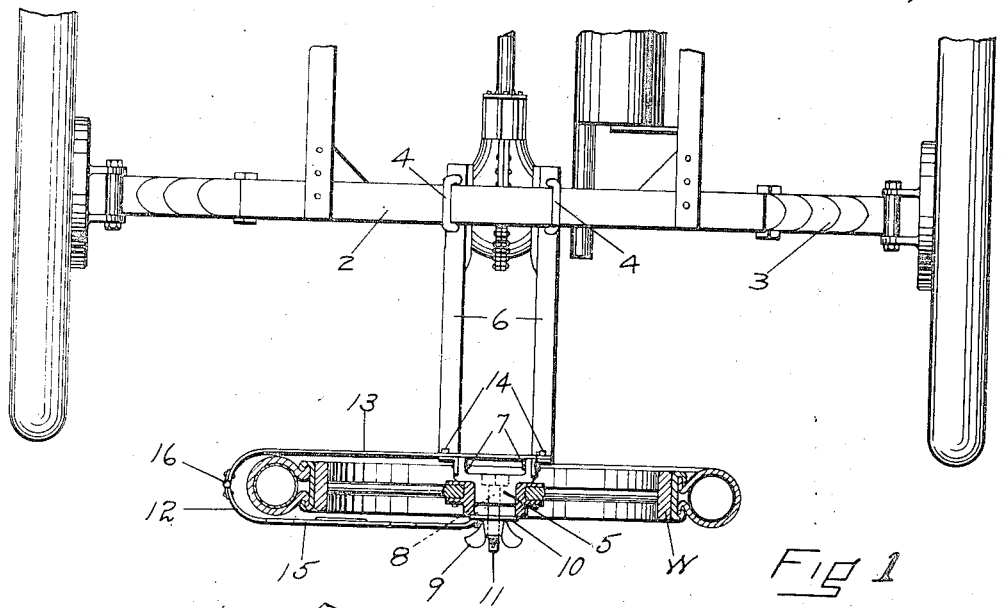

C. T. RIDGELY.
SPARE WHEEL CARRIER FOR VEHICLES.
APPLICATION FILED MAR. 8, 1918.

1,373,392. Patented Mar. 29, 1921.

INVENTOR
Charles T Ridgely
By his Attorneys
McDermott & McCready

UNITED STATES PATENT OFFICE.

CHARLES T. RIDGELY, OF SPRINGFIELD, OHIO.

SPARE-WHEEL CARRIER FOR VEHICLES.

1,373,392.        Specification of Letters Patent.    Patented Mar. 29, 1921.

Application filed March 8, 1918. Serial No. 221,277.

*To all whom it may concern:*

Be it known that I, CHARLES T. RIDGELY, a citizen of the United States, residing at Springfield, in the county of Clark and State of Ohio, have invented certain Improvements in Spare-Wheel Carriers for Vehicles, of which the following description, in connection with the accompanying drawings, is a specification, like reference characters on the drawings indicating like parts in the several figures.

This invention relates to spare wheel carriers for motor vehicles. The invention aims to devise a wheel carrier that can be easily installed by the owner of the vehicle without the use of special tools, which can be economically manufactured and which will secure both the wheel and the tire on it against theft. It is also an object of the invention to devise a wheel carrier having provision for supporting a license plate and a tail light.

The manner in which it is proposed to accomplish these objects will be readily understood from the following description when read in connection with the acompanying drawings and the novel features will be pointed out more particularly in the appended claims.

Figure 2:
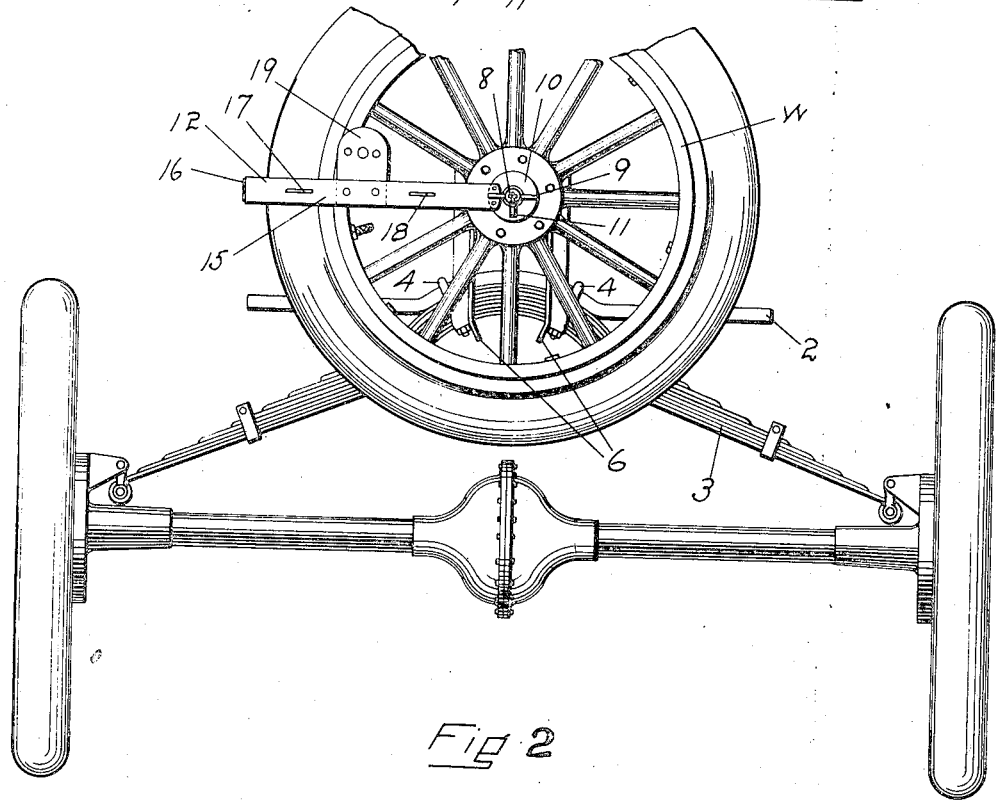

In the accompanying drawings,

Figure 1 is a plan view showing a wheel carrier embodying this invention attached to a vehicle; and Fig. 2 is a rear elevation of the construction shown in Fig. 1.

The drawings show a wheel carrier applied to a Ford car. In this type of car the rearward part of the body is mounted on a support 2 which, in turn, is supported by a cross spring 3, the part 2 being secured to the spring by two U-shaped bolts 4. The wheel support shown comprises a false hub 5 designed to receive the supplemental hub with which a spare wheel usually is provided and a bracket 6 that supports this false hub. This bracket preferably consists of two strips of angle iron, each having approximately a ninety degree bend and provided at its forward end with holes to receive the ends of one of the U-shaped bolts 4, so that when the bracket is clamped in its operative position the ends of the angle iron pieces take the place of the straps or clips that ordinarily are used under the nuts that clamp the U-shaped bolts 4 on the spring. The hub 5 preferably is provided with a base having shoulders shaped to receive the ends of the angle iron straps 6 and the hub is secured between the free ends of these straps by rivets 7, Fig. 1. This hub also is preferably cored out at its rearward side to receive the head of a bolt 8 which projects through the hub. A winged nut 9 threaded on the outer end of this bolt bears against a face plate 10 and clamps this plate against the front face of the spare wheel W. A hole is drilled through the end of the bolt in front of the nut 9 to receive a padlock 11 by means of which the nut and face plate may be locked against removal and thus prevent the removal of the wheel by unauthorized persons.

The arrangement so far described operates entirely satisfactorily merely as a support for the wheel. In order, however, to prevent the removal of the tire from the wheel while the wheel is locked on the support and also to provide for the securing of a tail light or lamp, or both, in a convenient position at the rear of the car, the carrier includes a U-shaped strap, indicated as a whole at 12, and arranged to encircle a portion of the wheel and the tire. This strap consists of a rear member or leg 13, secured to the hub 5 and bracket 6 by rivets 14, and a front leg 15 that is hinged to the rear leg 13 at 16. The face plate 10 is riveted to the free end of the front strap member 15 and the location of the hinge or pivot 16 near the periphery of the wheel enables the user to swing the face plate away from the hub, after removing the padlock 11 and the nut 9, to free the wheel and permit its removal from the hub 5. When another wheel has been mounted on the false hub 5, the part 15 is swung into its closed position with the face plate 10 resting against the front face of the hub of the wheel. The nut 9 is next screwed up to clamp the face plate in place and the padlock, if one is used, is snapped into the hole in the end of the bolt 8.

Two slots 17 and 18 are formed in the front member 15 of the strap 12 and afford a convenient means for the securing of a license plate to the part 15. This swinging member 15 also carries a bracket 19 which is riveted or otherwise rigidly secured to said member and which constitutes a conveninent support for a tail light, this bracket being provided with the necessary apertures required to clamp the tail light thereto and to receive the conductors that lead to it in case the light used is of the electric type.

It will now be seen that the carrier provided by this invention can be very economically manufactured, that it is rigid and substantial in construction and that it can be installed on a car without the making of any holes or the marring of the car in any manner. Furthermore the carrier securely locks both the wheel and the tire on it against theft and protects the tire from chafing while it is supported on the carrier.

It will also be noted that the false hub is inclosed in the hub of the wheel so it is protected in a manner that prevents the wheel from freezing on the carrier in very severe weather.

While I have herein shown and described the best embodiment of the invention of which I am at present aware, it will be understood that this embodiment may be modified within the skill of the mechanic and the discretion of the designer without departing from the spirit or scope of the invention.

What is claimed as new, is:—

1. A spare wheel carrier for vehicles, comprising a false hub support for the hub of the spare wheel, means for encircling a portion of the wheel and the tire thereon, but movable to permit removal of the wheel from the carrier, and means for fastening said tire-encircling means to the false hub to prevent removal from the carrier of either the wheel or the tire thereon.

2. A spare false hub wheel carrier for vehicles, comprising a wheel support, means for securing a wheel thereon, and a bracket on which said support is mounted, said bracket consisting of two parallel arms extending rearwardly of the vehicle body constructed to be fastened to the rear support for the vehicle body and locking devices adjustable relative to said hub and adapted to encircle a portion of said wheel to secure the wheel to the carrier.

3. The combination with a motor vehicle having a rear crossed spring to assist in supporting the body of the vehicle, of a bracket consisting of two opposite parallel arms secured to said spring, and a false hub support for a spare wheel mounted on said bracket and locking devices adjustable relative to said hub and adapted to encircle a portion of said wheel to secure the wheel to the carrier.

4. A spare wheel carrier for vehicles, comprising a false hub for supporting the hub of a wheel, a bracket supporting said hub, a U-shaped tire-encircling strap comprising two parts hinged together, one end of said strap being rigidly secured to the hub whereby the other end may be swung toward and from the hub to secure or release the wheel, and releasable means for securing said swinging end to the hub.

5. A spare wheel carrier for vehicles, comprising a false hub for supporting the hub of a wheel, a bracket supporting said hub, a U-shaped tire-encircling strap comprising two parts hinged together, one end of said strap being rigidly secured to the hub whereby the other end may be swung toward and from the hub to secure or release the wheel, and releasable means for securing said swinging end to the hub, said swinging end being constructed to support a license plate.

6. A spare wheel carrier for vehicles, comprising a false hub for supporting the hub of a wheel, a bracket supporting said hub, a U-shaped tire-encircling strap comprising two parts hinged together, one end of said strap being rigidly secured to the hub whereby the other end may be swung toward and from the hub to secure or release the wheel, releasable means for securing said swinging end to the hub, and a bracket carried by said swinging end for the support of a tail light.

7. A spare wheel carrier for vehicles, comprising two angle irons arranged side by side and having ends constructed to be secured to the rear part of the vehicle, a false hub secured to the opposite ends of said angle irons and constructed to support the hub of a wheel, said angle irons being bent to enable said hub to sustain the wheel in substantially a vertical plane, a U-shaped tire-encircling strap comprising two legs pivoted together, the free end of one of said legs being secured to said hub whereby the free end of the opposite leg may be swung toward and from said hub to secure or release a wheel, a bolt projecting from the front of said hub, and a nut on said bolt for clamping the free end of said strap on said bolt.

8. A wheel carrier comprising a standard having two side members, each constructed from angle iron, a spacing plate structurally connected with said members at the free ends thereof, and means for securing said members in service relation, said means embodying perforations formed in the outer flanges of said members, said perforations being arranged to aline with for receiving the threaded ends of the spring clips of an automobile for holding the platform spring for supporting the body of the automobile.

In testimony whereof I have signed my name to this specification.

CHARLES T. RIDGELY